United States Patent [19]

Tanaka et al.

[11] Patent Number: 4,529,925
[45] Date of Patent: Jul. 16, 1985

[54] REACTIVE POWER COMPENSATING CYCLOCONVERTER

[75] Inventors: Shigeru Tanaka, Tokyo; Susumu Tadakuma, Yamato, both of Japan

[73] Assignee: Tokyo Shibaura Denki Kabushiki Kaisha, Kawasaki, Japan

[21] Appl. No.: 562,213

[22] Filed: Dec. 16, 1983

[30] Foreign Application Priority Data

Dec. 27, 1982 [JP] Japan .................. 57-234050

[51] Int. Cl.³ .............................................. H02J 3/18
[52] U.S. Cl. .................... 323/207; 363/161; 323/211
[58] Field of Search ............... 323/207, 209, 210, 211; 363/9, 10, 160, 161, 162

[56] References Cited

U.S. PATENT DOCUMENTS 4,013,937  3/1977  Pelly et al. ........................ 323/102

OTHER PUBLICATIONS

Paper No. 608 in the 1982 National Meeting of Denki Gakkai (the Institute of Electronic Engineers), T. Fukao et al.

Primary Examiner—William H. Beha, Jr.
Assistant Examiner—Jeffrey Sterrett
Attorney, Agent, or Firm—Oblon, Fisher, Spivak, McClelland & Maier

[57] ABSTRACT

A power control apparatus which includes a cycloconverter having thyristors in which a circulating current flows, for supplying a compensating current to AC power lines; capacitors for supplying a reactive current component of the compensating current to the thyristors; a trigger control circuit for controlling the triggering of the thyristors; a detector coupled to the cycloconverter, for detecting from switching currents flowing through the thyristors a circulating signal corresponding to the circulating current. The compensating current serves to improve the power factor of the AC lines as well as to reduce higher harmonic currents on the AC lines. The circulating signal is fed back to the trigger control circuit so that the amount of the circulating current is kept substantially constant according to a negative feedback operation.

12 Claims, 11 Drawing Figures

REACTIVE POWER COMPENSATING CYCLOCONVERTER

BACKGROUND OF THE INVENTION

The present invention relates to a power control apparatus which corrects or compensates displacement angles of phase in AC power systems.

In recent years problems have arisen with respect to higher harmonic currents and/or reactive power which is induced in an AC power line by an electric arc furnace in steel production or by a large-scale power converter in the industry. When a load of the AC line induces much reactive power, power supply equipment should inevitably handle such reactive power as well as active power of the load. Further, a fluctuation of the reactive power provides a voltage variation in the AC line, resulting in unfavorable influence to other electrical equipment. In addition to this, an electromagnetic field induced by the higher harmonic currents adversely interfare with communication lines. Thus, a countermeasure for the higher harmonic currents and controlled generation of reactive power (compensating current) for improving the power factor of the AC line have become of major importance.

There has been proposed an active filter apparatus for reducing said higher harmonic currents and a reactive power compensation apparatus for cancelling the fluctuation of said reactive power.

Figure 1:
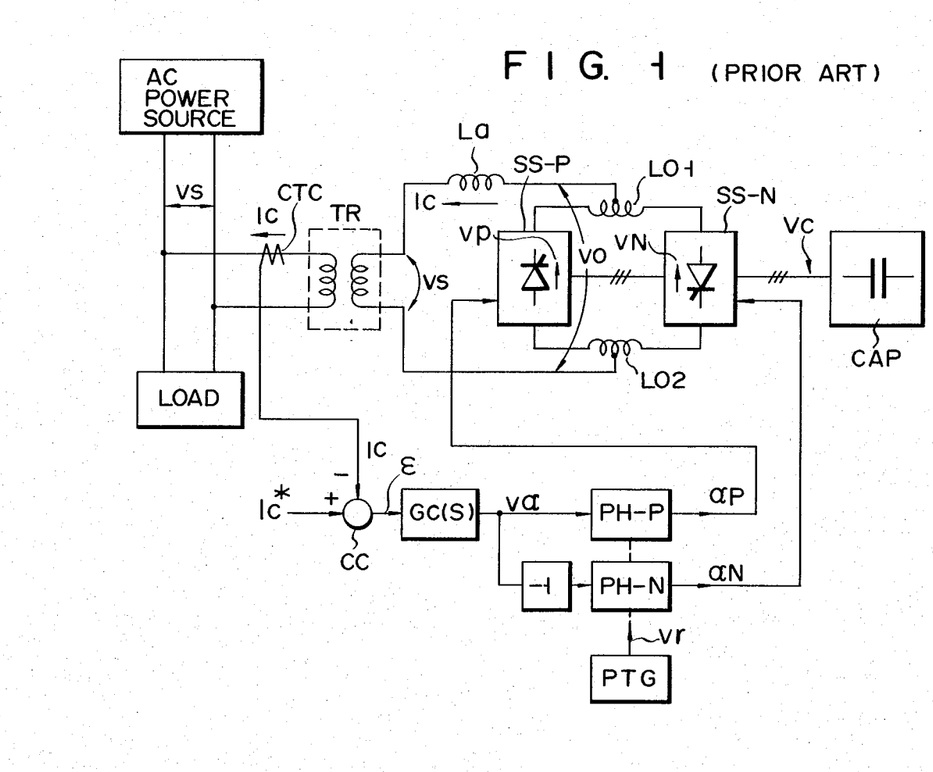
FIG. 1 shows a conventional power control apparatus.

FIG. 1 shows a conventional configuration of a power control apparatus. In the figure the reference symbol TR denotes a power transformer, La denotes an AC reactor, L01 and L02 respectively denote DC reactors, SS-P denotes a 3-phase bridge-connected converter for the positive component of a circulating current of a cycloconverter, SS-N denotes a 3-phase bridge-connected converter for the negative component of the circulating current, CAP denotes a phase advance capacitor, CTC denotes a current transformer, CC denotes a comparator, Gc(S) denotes a control compensator, -1 denotes an inverting amplifier, PH-P and PH-N respectively denote phase controller, and PTG denotes a 3-phase sine wave generator. The positive converter SS-P, negative converter SS-N and DC reactors L01, L02 jointly constitute a current circulating cycloconverter. Phase advance capacitor CAP serves as a high frequency reactive power source. The oscillation frequency of this high frequency reactive power is defined by the generator PTG.

A compensating current Ic supplied to the AC line is controlled as follows.

Compensating current Ic is detected by current transformer CTC. The detected value of current Ic obtained from current transformer CTC is inputted to comparator CC. Comparator CC receives a compensating current instruction Ic*. Comparator CC compares the detected value Ic with the instruction Ic* and provides an error signal $\epsilon$ being equal to the difference between the compared ones, i.e., $\epsilon = Ic^* - Ic$. Error signal e is supplied to control compensator Gc(S). The compensation characteristic or transfer function of compensator Gc(S) is determined based on the stability and response characteristcs of the control system. In the compensator Gc(S) the error signal $\epsilon$ is subjected to a proportional amplification and/or integration amplification, etc,. An output v$\alpha$ from compensator Gc(S) is supplied to phase controller PH-P. Output v$\alpha$ is phase-inverted via inverting amplifier -1 and then supplied to phase controller PH-N. Thus, the relation:

$$"\alpha N = 180° - \alpha P" \tag{1}$$

is assigned to the triggering phase angle $\alpha P$ of positive converter SS-P and that angle $\alpha N$ of negative converter SS-N. Converters SS-P and SS-N are so controlled that the output voltages from SS-P and SS-N are balanced at both center taps of respective DC reactors L01 and L02.

3-phase sine wave generator PTG provides a phase reference signal vr (3-phase sine wave) to phase controllers PH-P and PH-N. The triggering timing of each of converters SS-P and SS-N is determined based on the phase reference signal vr and the phase signal output v$\alpha$ from compensator Gc(S).

Now description will be given to the function of compensating current Ic in a case where the voltage Vc appearing across phase advance capacitor CAP, or the voltage Vc of the high frequency reactive power source, is established.

An output voltage vP of positive converter SS-P and an output voltage vN of negative converter SS-N may be represented as follows:

$$vP = kv \cdot Vc \cos \alpha P \tag{2}$$

$$vN = kv \cdot Vc \cos \alpha N = vP \tag{3}$$

where the symbol kv denotes a proportional constant. Then, the output voltage vo of the cycloconverter is:

$$vo = (vP + vN)/2 = vP \tag{4}$$

When the turning ratio of transformer TR is 1:1, the voltage difference (vo−vs) between the cycloconverter output voltage vo and the power source voltage vs is applied to AC reactor La, and the compensating current Ic flows through the reactor La.

When the detected value of compensating current Ic is below the value of instruction Ic*, the error $\epsilon = Ic^* - Ic$ becomes positive, resulting in increasing of the phase signal output v$\alpha$ and the cycloconverter output voltage vo. The increase of output voltage vo causes to enlarge the voltage difference (vo−vs) applied to AC reactor La. Then, the compensating current Ic becomes large and the detected value of Ic comes close to the value of instruction Ic*.

When the detected value of compensating current Ic exceeds the value of instruction Ic*, the error $\epsilon = Ic^* - Ic$ becomes negative, resulting in decreasing of the phase signal output v$\alpha$ and the cycloconverter output voltage vo. The decrease of output voltage vo causes to reduce the voltage difference (vo−vs) applied to AC reactor La. Then, the compensating current Ic becomes small and the detected value of Ic comes close to the value of instruction Ic*.

The compensating current instruction Ic* contains information of an active component being in-phase to the power source voltage vs, information of a reactive component whose phase is deviated by 90 degrees from the voltage vs, information of higher harmonics for compensating higher harmonic currents, and so on. The compensating current Ic is controlled such that the actual value of current Ic coincides with said instruction Ic*. When the cycloconverter receives an active component of voltage vs from the AC power source, the voltage Vc of phase advance capacitor CAP rises. When the cycloconverter supplies an active current component to the AC power source, the voltage Vc falls. A certain active current should be fed into the cycloconverter from the AC power source so as to cancel the operation loss of the apparatus, so that the voltage Vc of phase advance capacitor CAP is kept constant. Incidentally, an averaged reactive component of compensating current Ic has no effect to the voltage Vc.

The triggering timing of converters SS-P and SS-N is determined by the signal crossing point between the signal output from PTG and the phase signal $v\alpha$, and the frequency (fc) of the high frequency reactive power source is determined according to this triggering timing. The oscillation frequency fc of the high frequency reactive power source is equal to the output frequency of 3-phase sine wave generator PTG. That is, the operation of the high frequency reactive power source is similar to that of an externally controlled cycloconverter. In the operation of this reactive power source, a circulating current Io of the cycloconverter flows so that an oscillation condition (or resonance condition) of the cycloconverter is satisfied. At the time of power-on of the power control apparatus, the voltage Vc of phase advance capacitor CAP may be established in a manner that an active current component fed from the AC power line to the cycloconverter is used for the instruction Ic* of compensating current Ic.

Figure 2:
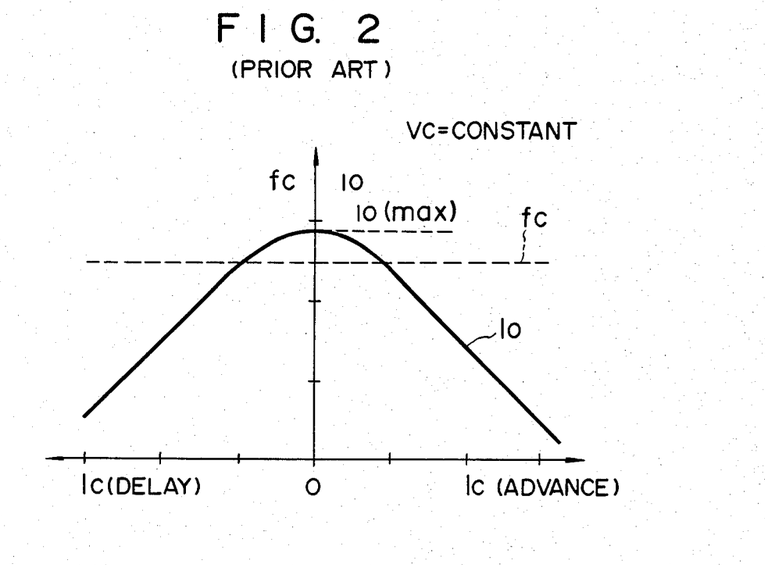
FIG. 2 shows a characteristic of the apparatus of FIG. 1, in which the relation among the compensating current Ic, circulating current Io and oscillation frequency fc of the high frequency reactive power source is illustrated.

FIG. 2 illustrates the relation among the compensating current Ic, circulating current Io of the cycloconverter and oscillation frequency fc of the high frequency reactive power source shown in FIG. 1. Voltage Vc and oscillation frequency fc are controlled to keep them substantially constant and are independent of the magnitude of compensating current Ic. Thus, a phase-advanced reactive current Icap flowing through phase advance capacitor CAP is:

$$Icap = Vc \cdot 2\pi fc \cdot C = constant \quad (5)$$

where C denotes the capacitance (F) of capacitor CAP. The cycloconverter consumes the delayed reactive power from the high frequency power source. The oscillation condition of the high frequency power source is established at a state wherein the delayed reactive power is equal to the advanced reactive power from capacitor CAP. Thus, the oscillation condition is:

$$IQ = Icap \quad (6)$$

where IQ denoted a delayed reactive current of the delayed reactive power.

Now, consideration is given to the delayed reactive current IQ. Suppose that a triggering phase angle of positive converter SS-P and an output current therefrom are denoted by $\alpha P$ and IP, respectively, and that a triggering phase angle of negative converter SS-N and an output current therefrom are denoted by $\alpha N$ and IN, respectively. Then, delayed reactive current IQ may be represented as:

$$IQ = KI(IP \cdot \sin \alpha P + IN \cdot \sin \alpha N) \quad (7)$$

where KI denotes a conversion constant.

Figure 2A:
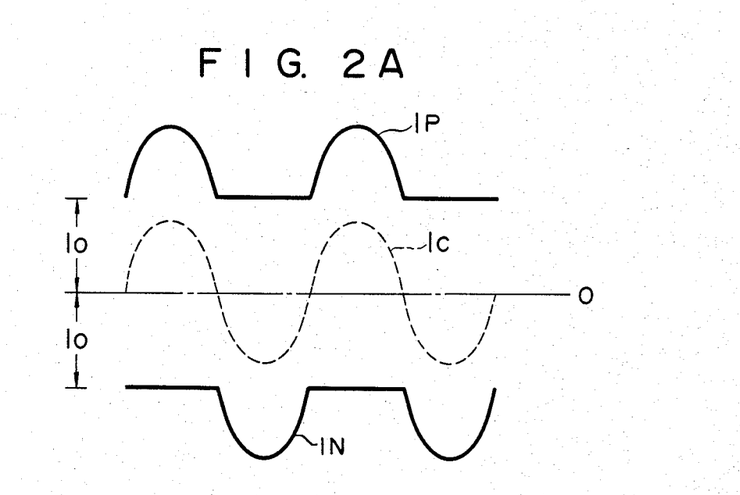
FIG. 2A illustrates waveforms of output currents IP and IN of converters SS-P and SS-N and that of compensating current Ic.

FIG. 2A shows waveforms of the output currents IP and IN. In this figure, the dashed line is a waveform of the compensating current Ic corresponding to IP+IN, and the DC shift level of each of currents IP and IN corresponds to the circulating current Io. Based on the consideration of Eq. (1) and FIG. 2A, Eq. (7) may be modified as:

$$\begin{aligned}IQ &= KI(IP + IN) \sin \alpha P \\ &= KI(|Ic| + 2 \cdot Io) \sin \alpha P\end{aligned} \quad (8)$$

where |Ic| denotes the absolute value of compensating current Ic and Io denotes the circulating current. From Eq. (8), the specific circulating current Io satisfying the oscillation condition of Eq. (6) is represented as:

$$Io = (\tfrac{1}{2})[IQ/(KI \cdot \sin \alpha P) - |IC|] \quad (9)$$

Incidentally, exactly speaking, the amount of circulating current Io transiently varies as the transient change of triggering phase angle $\alpha P$ and/or compensating current Ic. However, FIG. 2 illustrates the average of circulating current Io.

According to the conventional power control apparatus as mentioned above, when the magnitude of compensating current Ic exceeds a certain value, the absolute value |Ic| of compensating current Ic becomes larger than the term "$IQ/(KI \cdot \sin \alpha P)$" of Eq. (9). In this case, so long as the oscillation condition of Eq. (6) is established, the polarity of circulating current Io must be negative, but a negative circulating current cannot be obtained. From this, the maximum value of compensating current Ic of the conventional apparatus is restricted to the value being obtained at Io=0. Thus, the maximum compensating current Icmax of the conventional apparatus is:

$$Icmax = IQ/(KI \cdot \sin \alpha P) = Icap/(KI \cdot \sin \alpha P) \quad (10)$$

Eqs. (9) and (10) teach that, when large Icmax is required in a certain application of the power control apparatus, the amount of circulating current Io at Ic=0 becomes inevitably large, resulting in increasing of unnecessary power loss due to the large amount of circulating current Io.

SUMMARY OF THE INVENTION

It is accordingly an object of the present invention to provide a power control apparatus in which power loss at a small circulating current Ic can be reduced and current feeding capacity of the compensating current Ic can be enhanced.

Another object of the invention is to provide a power control apparatus in which the amount of circulating current Io is retained substantially constant regardless of the amount of the compensating current Ic.

To achieve the above object, a power control apparatus of the invention includes a cycloconverter in which a circurating current flows, for supplying a compensating current to an AC power line; reactance means for supplying a reactive current component of the compensating current to the cycloconverter; trigger control means coupled to the cycloconverter, for controlling the triggering of the cycloconverter; and means coupled to the cycloconverter, for detecting the circulating current and generating a detected signal corresponding to the circulating current. The detected signal is fed back to the trigger control means in such a manner that the amount of the circurating current is kept substantially constant.

According to the power control apparatus having the above configuration, the circulating current of the cycloconverter becomes substantially constant regardless of the amount of the compensating current. Thus, it is possible to provide a large compensating current under the condition that the circulating current is restricted to a certain small amount. From this, a power control apparatus having small power loss and large compensating current feeding capacity is obtained.

DETAILED DESCRIPTION OF THE PREFERRED EMBODIMENT

The preferred embodiment of the invention will now be described hereinbelow, with reference to the accompanying drawings. In the description, common elements in respective drawings are designated by common reference symbols.

Figure 3:
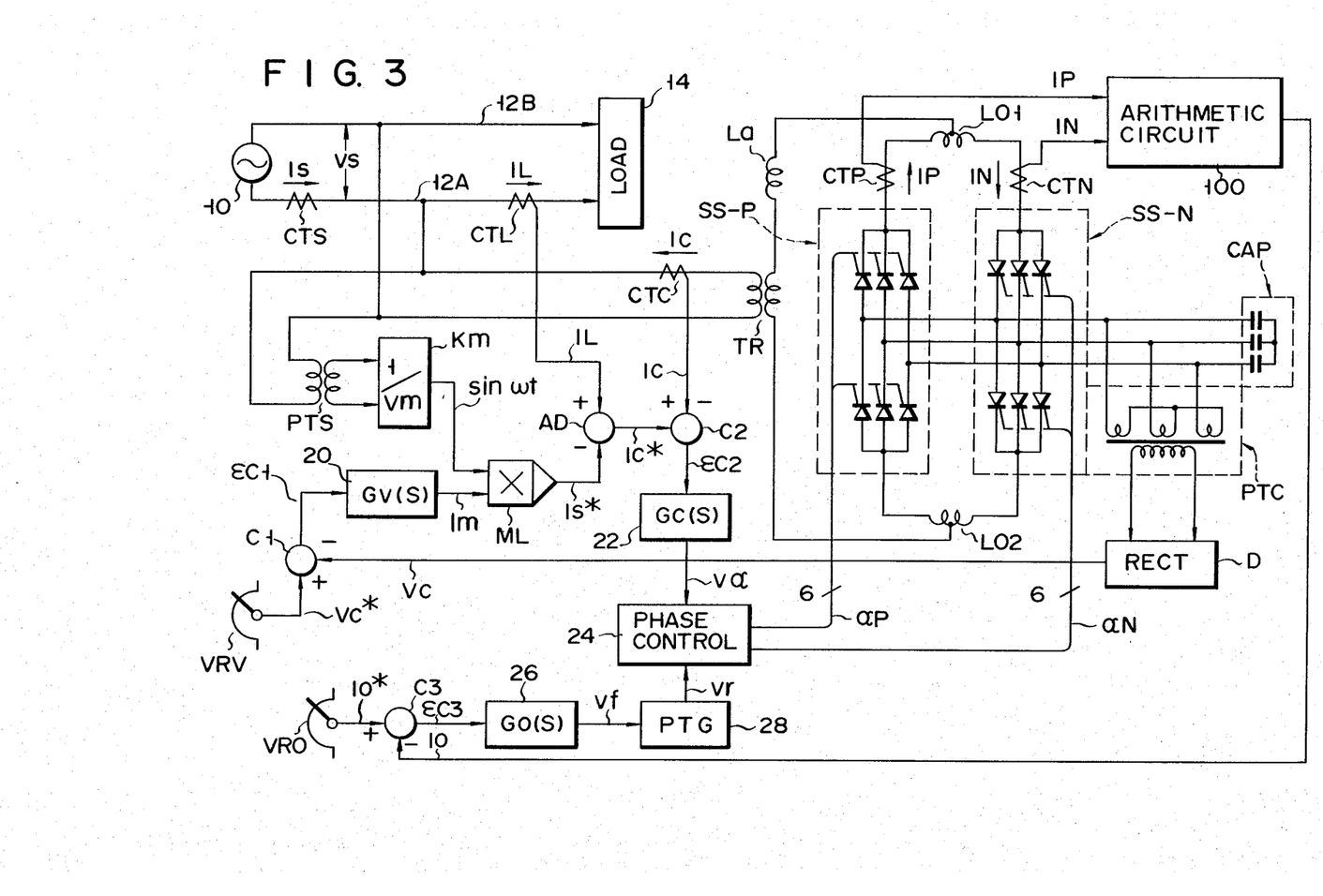
FIG. 3 shows a configuration of a power control apparatus according to the present invention.

FIG. 3 shows a configuration of a power control apparatus of the invention. An AC power source 10 is coupled via AC power lines 12A and 12B to a load 14. Load 14 may include an inductive or a capacitive element. AC lines 12A and 12B are coupled to the secondary winding of a power transformer TR of a cycloconverter. One end of the primary winding of transformer TR is coupled via an AC reactor La to the center tap of a DC reactor L01, and the other end thereof is connected to the center tap of a DC reactor L02. One end of DC reactor L01 is connected to the cathode circuit of 3-phase bridge-connected thyristors of a positive converter SS-P. One end of DC reactor L02 is connected to the anode circuit of the thyristors of converter SS-P. The other end of DC reactor L01 is connected to the anode circuit of 3-phase bridge-connected thyristors of a negative converter SS-N. The other end of DC reactor L02 is connected to the cathode circuit of the thyristors of converter SS-N.

Each connection point between the anode and cathode of series-connected thyristors of converters SS-P and SS-N is connected to a star-connected phase advance capacitor CAP.

An output current IP of converter SS-P is sensed by a DC current transformer CTP, and an output current IN of converter SS-N is sensed by a DC current transformer CTN. Sensed outputs IP and IN from transformers CTP and CTN are converted via an arithmetic circuit 100 to a signal Io corresponding to a circulating current of the cycloconverter. An AC source current Is from AC power source 10 is sensed by a current transformer CTS, an AC load current IL to load 14 is sensed by a current transformer CTL, and a compensating current Ic from transformer TR to AC lines 12A and 12B is sensed by a current transformer CTC.

3-phase AC voltages applied to the capacitor CAP are converted via a transformer PTC and a rectifier D to a DC voltage Vc. Voltage Vc is supplied to the negative input of a comparator C1. The positive input of comparator C1 receives a voltage instruction Vc* from a voltage setting potentiometer VRV. Comparator C1 outputs a difference signal $\epsilon c1$ being represented as:

$$\epsilon c1 = Vc^* - Vc \tag{11}$$

Signal $\epsilon c1$ is inputted to a compensation circuit 20 having a transfer function Gv(S). Circuit 20 integrates and/or proportionally amplifies the inputted signal ecl and outputs a peak instruction Im.

Instruction Im defines the peak level of AC source current Is. Instruction Im is inputted to one input of a multiplier ML whose other input receives a unit sine signal (sin $\omega t$). The unit signal sin $\omega t$ is obtained via a transformer PTS and a coefficient amplifier Km from an AC voltage vs appearing across AC lines 12A and 12B (here, the amplification factor of amplifier Km is selected to 1/Vm). Unit signal sin $\omega t$ is synchronized to the AC voltage vs. Multiplier ML outputs an active current instruction Is* being represented as:

$$Is^* = Im \sin \omega t \tag{12}$$

Instruction Is* is supplied to the negative input of an subtracter AD whose positive input receives a load current signal IL from current transformer CTL. Subtracter AD outputs a compensating current instruction Ic* being represented as:

$$Ic^* = IL - Is^* \tag{13}$$

Instruction Ic* is supplied to the positive input of a comparator C2 whose negative input receives a compensation current signal Ic from current transformer CTC. Comparator C2 outputs a difference signal $\epsilon c2$ being represented as:

$$\epsilon c2 = Ic^* - Ic \tag{14}$$

Signal $\epsilon c2$ is inputted to a compensation circuit 22 having a transfer function Gc(S). Circuit 22 integrates and/or proportionally amplifies the inputted signal $\epsilon c2$ and outputs a phase signal $v\alpha$.

Phase signal $v\alpha$ is supplied to a phase control circuit 24. Circuit 24 receives a phase reference signal vr. Signal vr is obtained according to a current instruction Io* and signal Io from arithmetic circuit 100. Instruction Io* outputted from a current setting potentiometer VRO is supplied to the positive input of a comparator C3 whose negative input receives the signal Io. Comparator C3 outputs a difference signal $\epsilon c3$ being represented as:

$$\epsilon c3 = Io^* - Io \quad (15)$$

Signal $\epsilon c3$ is inputted to a compensation circuit 26 having a transfer function Go(S). Circuit 26 integrates and/or proportionally amplifies the inputted signal $\epsilon c3$ and outputs a frequency signal vf. Signal vf is converted to the phase reference signal vr by a 3-phase sine wave generator 28.

Figure 3A:
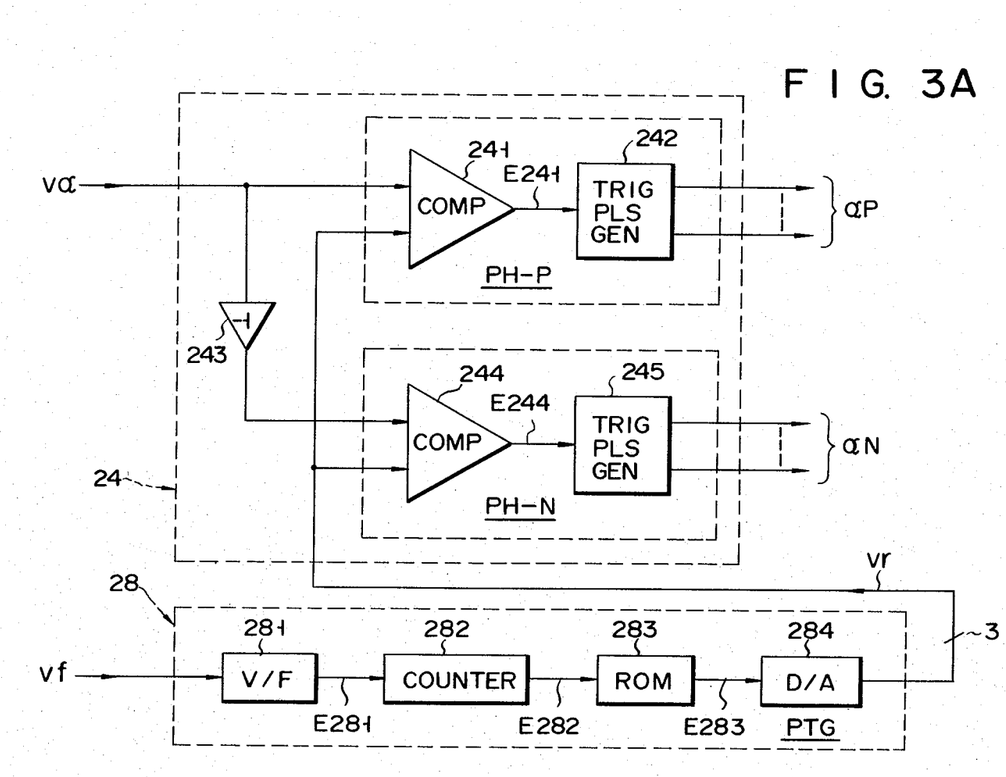
FIG. 3A shows detailed configurations of phase control circuit 24 and 3-phase sine wave generator 28 of FIG. 3.

FIG. 3A shows detailed configurations of the phase control circuit 24 and 3-phase sine wave generator 28. The frequency signal vf from compensation circuit 26 is inputted to a voltage-frequency (V/F) converter 281. V/F converter 281 converts the signal vf into a clock pulse E281 having a frequency corresponding to the voltage potential of signal vf. Pulse E281 clocks a counter 282. The counted result or a count output E282 of counter 282 is supplied as address data to a ROM 283 in which 3-phase sine wave data is stored. From a specific address of ROM 283 being designated by the address data (E282), digital sine wave data E283 is read out. The read-out digital data E283 is converted via a D/A converter 284 to an analog 3-phase sine wave signal which is used as the phase reference signal vr.

Signal vr is supplied to each one input of comparators 241 and 244. The other input of comparator 241 receives the phase signal output $v\alpha$ form compensation circuit 22. Output $v\alpha$ is supplied via an inverter 243 to the other input of comparator 244. Comparator 241 generates a trigger pulse E241 each time when the potential of output $v\alpha$ intersects the potential of signal vr. Pulse E241 triggers a trigger pulse generator 242. Generator 242 generates signals ($\alpha P$) determining the triggering phase angle of positive converter SS-P. Comparator 244 generates a trigger pulse E244 each time when the phase-inverted potential of output $v\alpha$ intersects the potential of signal vr. Pulse E244 triggers a trigger pulse generator 245. Generator 245 generates signals ($\alpha N$) determining the triggering phase angle of negative converter SS-N.

Figure 3B:
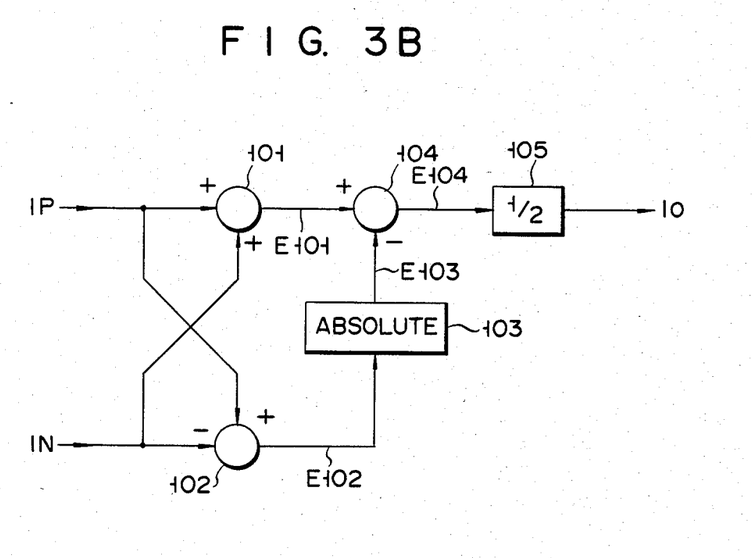
FIG. 3B shows a configuration of arithmetic circuit 100 of FIG. 3.

FIG. 3B shows a configuration of arithmetic circuit 100. Sensed output IP from current transformer CTP and sensed output IN from current transformer CTN are supplied to an adder 101. The output IP is supplied to the positive input of a subtracter 102 whose negative input receives the output IN. Adder 101 outputs a signal E101 corresponding to IP+IN. Subtracter 102 outputs a signal E102 corresponding to IP−IN. Signal E102 is supplied to an absolute circuit 103. Circuit 103 outputs a signal E103 corresponding to |IP−IN| ("| |" denotes the absolute value). Circuit 103 may be formed of a linear full wave rectifier circuit. Signal E101 is supplied to the positive input of a subtracter 104 whose negative input receives the signal E103. Subtracter 104 outputs a signal E104 corresponding to E101-E103 or IP+IN−|IP−IN|. Signal E104 is converted, via a multiplier 105 having a coefficient of ½, to the circulating current signal Io. Thus, the signal Io is represented as:

$$Io = (IP + IN - |IP - IN|)/2 \quad (16)$$

Incidentally, if the turning ratio of power transformer TR is 1:1, the amount of compensating current Ic becomes equal to IP+IN. In this case, Eq. (16) may be modified as:

$$Io = (IP + IN - |Ic|)/2 \quad (17)$$

where |Ic| denotes the absolute value of compensating current Ic.

The power control apparatus as shown in FIGS. 3, 3A and 3B will operate as follows.

When the voltage Vc of phase advance capacitor CAP is below the value of instruction Vc*, the difference signal $\epsilon c1 = Vc^* - Vc$ (Eq. (11)) becomes positive, resulting in increasing of the peak instruction Im. The increase of instruction Im causes to enlarge the active current instruction Is* (Eq. (12)). Then, the load current IL as well as the active current Is on AC lines 12A and 12B are increased. If an active current component being consumed at the load 14 is fixed, the enlarged portion of the above active current Is becomes a part of compensating current Ic. The enlarged portion of current Is flows from the AC lines to the cycloconverter, and the electric charge corresponding to this enlarged portion serves to increase the voltage Vc of phase advance capacitor CAP. From the above operation, the value of voltage Vc becomes closed to the value of voltage instruction Vc*.

When the voltage Vc of phase advance capacitor CAP exceeds the value of instruction Vc*, the signal $\epsilon c1 = Vc^* - Vc$ becomes negative, resulting in decreasing of the peak instruction Im. The decrease of instruction Im causes to reduce the active current instruction Is*. Then, the load current IL as well as the active current Is on AC lines 12A and 12B are decreased. If the active current component consumed at load 14 is fixed, the reduced portion of the above active current Is becomes a part of compensating current Ic. The reduced portion of current Is flows from the cycloconverter to the AC lines, and the electric charge corresponding to this reduced portion serves to decrease the voltage Vc of phase advance capacitor CAP. From the above operation, the value of voltage Vc becomes closed to the value of voltage instruction Vc*.

When the detected value of compensating current Ic is below the value of instruction Ic*, the difference signal $\epsilon c2 = Ic^* - Ic$ (Eq. (14)) becomes positive, resulting in increasing of the phase signal output $v\alpha$ and the cycloconverter output voltage vo. The increase of output voltage vo causes to enlarge the voltage difference (vo−vs) applied to AC reactor La. Then, the compensating current Ic becomes large and the detected value of current Ic comes close to the value of instruction Ic*.

When the detected value of compensating current Ic exceeds the value of instruction Ic*, the signal $\epsilon c2 = Ic^* - Ic$ becomes negative, resulting in decreasing of the phase signal output $v\alpha$ and the cycloconverter output voltage vo. The decrease of output voltage vo causes to reduce the voltage difference (vo−vs) applied to AC reactor La. Then, the compensating current Ic becomes small and the detected value of current Ic comes close to the value of instruction Ic*.

Compensating current instruction Ic* contains information of an active component being in-phase to the power source voltage vs, information of a reactive component being phase-deviated by 90 degrees from the voltage vs, information of higher harmonics for compensating higher harmonic currents, etc.

Compensating current Ic is controlled such that the actual value of current Ic coincides with said instruction Ic*.

When the cycloconverter receives an active component of voltage vs from AC power lines 12A and 12B, the voltage Vc of phase advance capacitor CAP rises. When the cycloconverter supplies an active current component to AC power lines 12A and 12B, the voltage Vc falls. In practice, a certain active current is supplied from AC power lines 12A and 12B to the cycloconverter in order to cancel or minimize the operation loss of the power control apparatus, thereby the voltage Vc of phase advance capacitor CAP being kept constant.

Now, description will be given to a case where the load current IL varies.

The total amount of energy circulation of reactive components and higher harmonics components contained in the load current IL are, if they are averaged, substantially zero. When the integration time constant of control compensator 20 having transfer function Gv(S) is quite large, the value of peak instruction Im is almost unvaried with the change of load current IL. Thus, the active current instruction Is* becomes nearly constant (See Eq. (12)). In this case, the compensating current instruction Ic* is substantially proportional to the change of load current IL (See Eq. (13)). This means that the load current IL can be compensated by the compensating current Ic without changing the AC source current Is.

When the active component of load current IL varies, said energy circulation is effected. As mentioned above, when contorl compensator 20 has large time constant, the active current instruction Is* is insensitive to the transient quick change of load current IL; while the compensating current instruction Ic*, and hence the compensating current Ic, is quickly changed in response to the quick change of load current IL. This means that the compensating current Ic contains an active component and that the voltage Vc of phase advance capacitor CAP varies with the energy circulation of this active component.

For instance, when the active component of load current IL quickly increases, the increment component of this current IL is temporarily supplied, as a part of the compensating current Ic, from the cycloconverter to the AC lines 12A and 12B. This current supply causes to reduce the voltage Vc of capacitor CAP. Then, the value of voltage Vc becomes smaller than that of voltage instruction Vc*, resulting in increasing of the difference signal εc1 (See Eq. (11)), and the peak instruction Im gradually increases. From this, the active component of AC source current Is also gradually increases, and this gradual increase of current Is takes on the incremented active component of load current IL. The increase of AC source current Is is effected until the voltage Vc of capacitor CAP corresponds to the voltage instruction Vc*. After all, all incremented actual component of load current IL is supplied by the compensating current Ic.

When the active component of load current IL quickly decreases, the decrement component of this current IL is temporarily supplemented as a part of the compensating current Ic. This current supplement causes to increase the voltage Vc of capacitor CAP. Then, the value of voltage Vc becomes larger than that of voltage instruction Vc*, resulting in decreasing of the difference signal εc1 (See Eq (11)), and the peak instruction Im gradually decreases. From this, the active component of AC source current Is also gradually decreases, and this gradual decrease of current Is takes on the decremented active component of load current IL. The decrease of AC source current Is is effected until the voltage Vc of capacitor CAP corresponds to the voltage instruction Vc*. After all, all decremented actual component of load current IL is supplemented by the compensating current Ic.

When the detected value of circulating current Io is smaller than the value of current instruction Io*, the difference signal $\epsilon c3 = Io^* - Io$ (Eq. (15)) becomes positive, resulting in rising of the potential of frequency signal vf. The frequency of clock pulse E281 outputted from V/F converter 281 (FIG. 3A) rises as the potential of frequency signal vf rises. Then, the changing rate of the contents of count output E282 becomes high. The high changing rate of count output E282 renders the frequency of digital sine wave data E283 high. Accordingly, the frequency of phase reference signal vr from D/A converter 284 becomes high, and hence the oscillation frequency fc of the high frequency reactive power source (CAP) rises.

Since the voltage Vc of phase advance capacitor CAP is controlled to be constant and the capacitance C of capacitor CAP is fixed, the phase-advanced reactive current Icap is proportional to the oscillation frequency fc of the reactive power source (See Eq. (5)). Namely, the potential increase of frequency signal vf causes the frequency rise of phase reference signal vr, and the frequency-risen signal vr renders the oscillation frequency fc increased. The increased frequency fc renders the reactive current Icap large (Eq. (5)). The large current Icap provides a large delayed reactive current IQ provided that the oscillation condition of Eq. (6) is satisfied. The large current IQ causes a large circulating current Io when the amount of compensating current Ic is constant (Eq. (8)). Accordingly, when Io is smaller than Io*, the oscillation frequency fc of the reactive power source is changed to such a value that Io=Io*.

When the detected value of circulating current Io is larger than the value of current instruction Io*, the signal $\epsilon c3 = Io^* - Io$ becomes negative, resulting in falling of the potential of frequency signal vf. The frequency of clock pulse E281 outputted from V/F converter 281 (FIG. 3A) falls as the potential of frequency signal vf falls. Then, the changing rate of the contents of count output E282 becomes low. The low changing rate of count output E282 renders the frequency of digital sine wave data E283 low. Accordingly, the frequency of phase reference signal vr from D/A converter 284 becomes low, and hence the oscillation frequency fc of the high frequency reactive power source (CAP) falls.

Since the voltage Vc of phase advance capacitor CAP is controlled to be constant and the capacitance C of capacitor CAP is fixed, the phase-advanced reactive current Icap is proportional to the oscillation frequency fc of the reactive power source (See Eq. (5)). Namely, the potential decrease of frequency signal vf causes the frequency fall of phase reference signal vr, and the frequency-fallen signal vr renders the oscillation frequency fc decreased. The decreased frequency fc renders the reactive current Icap small (Eq. (5)). The small current Icap provides a small delayed reactive current IQ provided that the oscillation condition of Eq. (6) is satisfied. The small current IQ causes a small circulating current Io when the amount of compensating current Ic is constant (Eq. (8)). Accordingly, when Io is larger than Io*, the oscillation frequency fc of the reactive power source is changed to such a value that Io=Io*.

Figure 4:
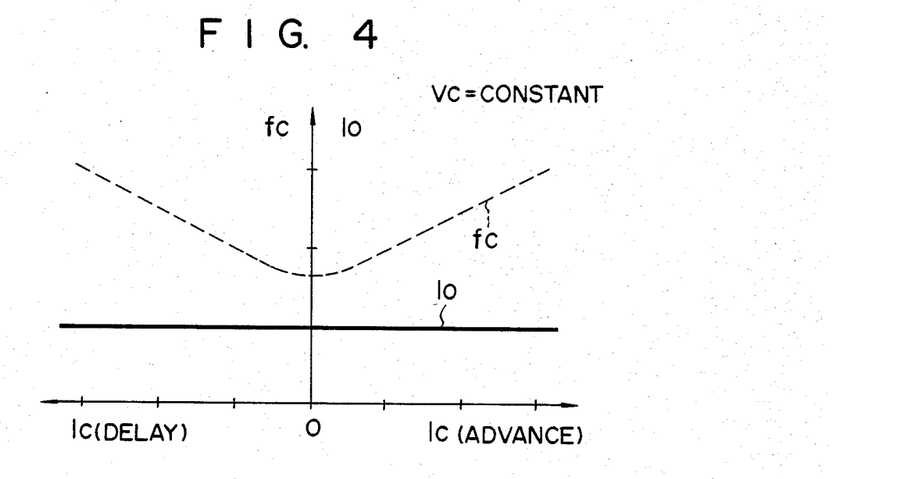
FIG. 4 shows a characteristic of the apparatus of FIG. 3, in which the relation among the compensating current Ic, circulating current Io and oscillation frequency fc of the high frequency reactive power source is illustrated.

FIG. 4 illustrates the relation among the compensating current Ic, circulating current Io of the cycloconverter and oscillation frequency fc of the high frequency reactive power source shown in FIG. 3. According to the configuration of FIG. 3, the circulating current Io is controlled to be equal to the current instruction Io* having a given (constant) value. This means that the circulating current Io is constant and independent of the compensating current Ic (FIG. 4). Therefore, the amount of circulating current Io can be minimized, while the amount of compensating current Ic may be set at an optional or optimum value. Thus, according to the configuration of FIG. 3, it is posssible to effectively reduce the power loss due to the circulating current Io and, even if the oscillation condition of Eq. (6) is destroyed, the cycloconverter can supply the compensating current Ic to the AC lines 12A and 12B.

Figure 5:
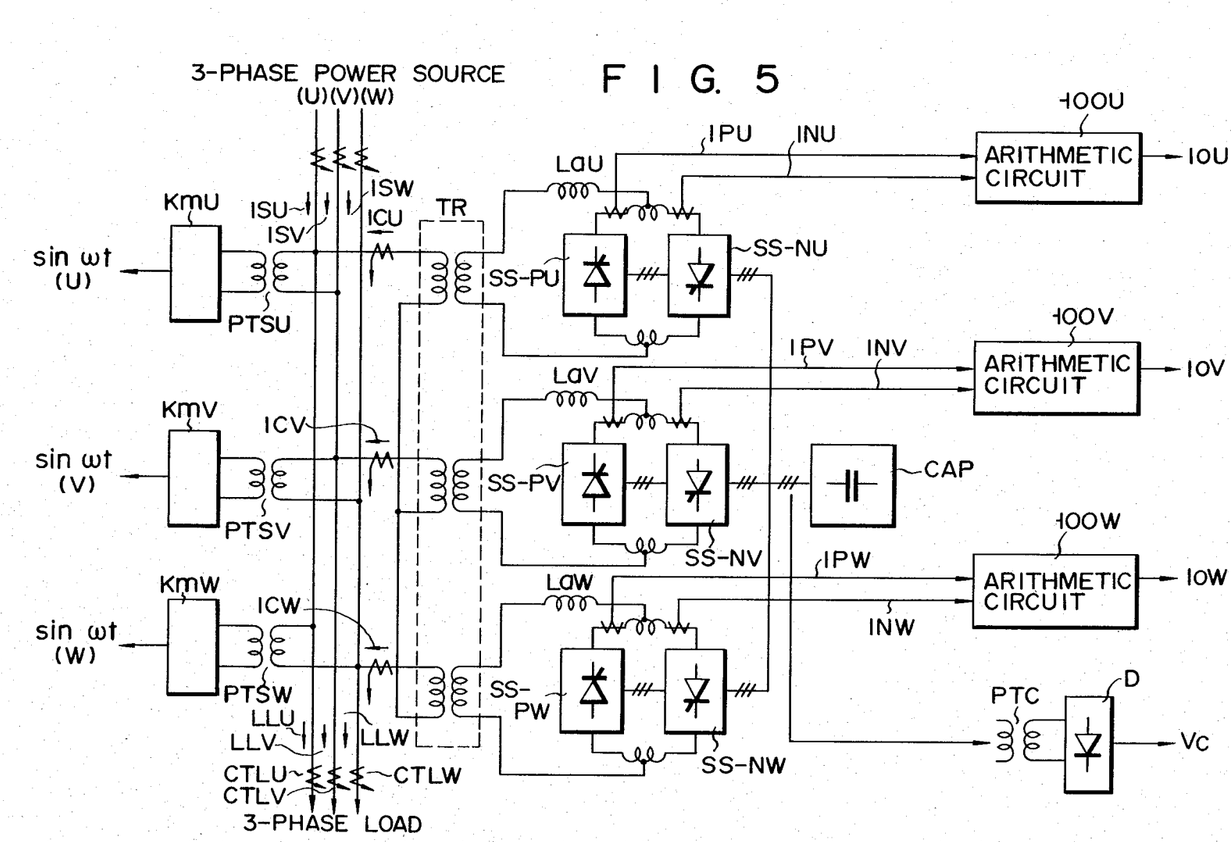
FIGS. 5 and 6 jointly show a modification of FIG. 3, in which three sets of positive/negative converters (SS-P and SS-N) for 3-phase power source are employed.
Figure 6:
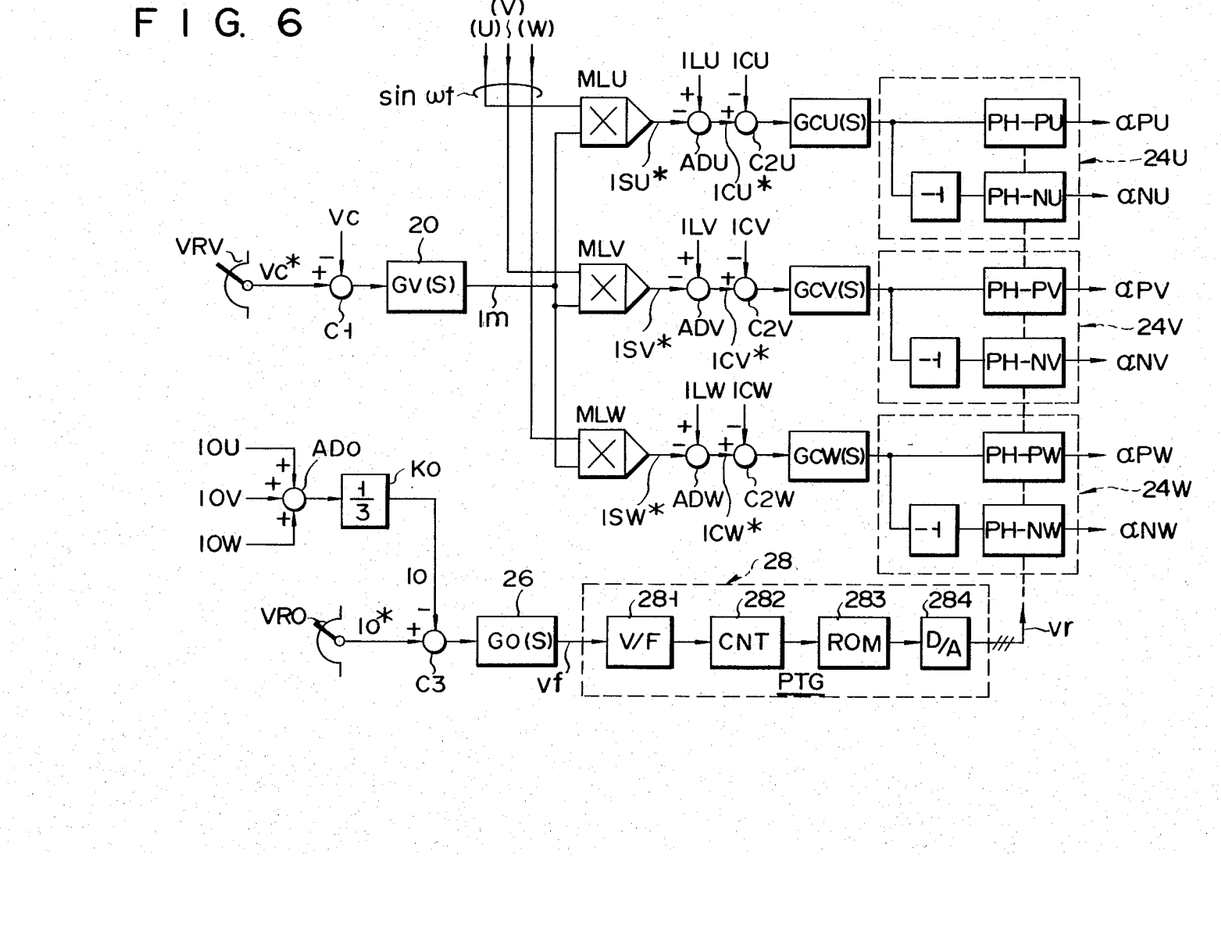

FIGS. 5 and 6 jointly show another embodiment of the present invention which may be considered as a modification of the embodiment of FIGS. 3, 3A and 3B. The embodiment of FIG. 3 is directed to an application of single-phase AC power lines, while the embodiment of FIGS. 5 and 6 is directed to an application of balanced 3-phase AC power lines.

In FIG. 5, symbols U, V and W denote 3-phase AC power sources; TR denotes a 3-phase power transformer; LU, LV and LW denote cycloconverters of respective phases of 3-phase; and CAP denotes a phase advance capacitor for the 3-phase. The operation of the cycloconverter of each phase is substantially the same as that of the cycloconverter of FIG. 3. Accordingly, description as to the common operation is omitted here.

In FIG. 5 the circulating current IoU of a U-phase cycloconverter (SS-PU, SS-NU) is detected by a U-phase arithmetic circuit 100U. The circulating current IoV of a V-phase cycloconverter (SS-PV, SS-NV) is detected by a V-phase arithmetic circuit 100V. The circulating current IoW of a W-phase cycloconverter (SS-PW, SS-NW) is detected by a W-phase arithmetic circuit 100W. The detected currents IoU, IoV and IoW are added together in an adder ADo, and the added result is converted to an averaged circulating current signal Io via a coefficient amplifier Ko having an amplification factor of ⅓. Signal Io is compared with the current instruction Io* at comparator C3, and the compared result is converted to the phase reference signal vr via compensator 26 and PTG 28. Signal vr is supplied to a U-phase controller 24U, a V-phase controller 24V and a W-phase controller 24W.

The oscillation condition of the high frequency reactive power source of FIG. 5 is such that the total (IQT) of respective delayed reactive currents of three cycloconverters (SS-PU/SS-NU; SS-PV/SS-NV; SS-PW/SS-NW) is equal to the advanced reactive current Icap of phase advance capacitor CAP. Thus, the following relation is established:

$$IQT = Icap \tag{18}$$

The oscillation frequency fc of the high frequency reactive power source is controlled such that the condition of Eq. (18) is satisfied. Under the control satisfying Eq. (18), the frequency of phase reference signal vr is so controlled that the difference between the averaged circulating current signal Io and the current instruction Io* becomes minimum.

As seen from FIG. 5, a U-phase unit sine wave signal sin ωt (U) is obtained from 3-phase AC power lines via a transformer PTSU and coefficient amplifier KmU. A V-phase unit sine wave signal sin ωt (V) is obtained from the 3-phase AC power lines via a transformer PTSV and coefficient amplifier KmV. A W-phase unit sine wave signal sin ωt (W) is obtained from the 3-phase AC power lines via a transformer PTSW and coefficient amplifier KmW. Signals sin ωt (U), sin ωt (V) and sin ωt (W) are inputted to multipliers MLU, MLV and MLW (FIG. 6), respectively. Each of multipliers MLU, MLV and MLW receives the peak instruction Im from comparator C1 via compensation circuit 20. The nature of this instruction Im is the same as that of the instruction Im of FIG. 3.

Multipliers MLU, MLV and MLW provide a U-phase active current instruction IsU*, a V-phase active current instruction IsV*, and a W-phase active current instruction IsW*, respectively. Instructions IsU*, IsV* and IsW* may be represented as:

$$\begin{aligned} IsU^* &= Im \cdot \sin \omega t \\ IsV^* &= Im \cdot \sin (\omega t - 2\pi/3) \\ IsW^* &= Im \cdot \sin (\omega t - 2\pi/3) \end{aligned} \tag{19}$$

Instruction IsU* is supplied to the negative input of a U-phase subtracter ADU (FIG. 6) which receives at its positive input a U-phase load current signal ILU outputted from a U-phase current transformer CTLU (FIG. 5). Instruction IsV* is supplied to the negative input of a V-phase subtracter ADV which receives at its positive input a V-phase load current signal ILV outputted from a V-phase current transformer CTLV. Instruction IsW* is supplied to the negative input of a W-phase subtracter ADW which receives at its positive input a W-phase load current signal ILW outputted from a W-phase current transformer CTLW. Subtracters ADU, ADV and ADW provide a U-phase compensating current instruction IcU*, a V-phase compensating current instruction IcV* and a W-phase compensating current instruction IcW*, respectively. Instructions IcU*, IcV* and IcW* may be represented as:

$$\begin{aligned} IcU^* &= ILU - IsU^* \\ IcV^* &= ILV - IsV^* \\ IcW^* &= ILW - IsW^* \end{aligned} \tag{20}$$

A U-phase compensating current IcU is controlled such that the difference between the detected value of IcU and the U-phase instruction IcU* becomes minimum. A V-phase compensating current IcV is controlled such that the difference between the detected value of IcV and the V-phase instruction IcV* becomes minimum. A W-phase compensating current IcW is controlled such that the difference between the detected value of IcW and the W-phase instruction IcW* becomes minimum.

In the 3-phase lines, the 3-phase load currenets ILU, ILV and ILW have the following relation:

$$ILU + ILV + ILW = 0 \tag{21}$$

When the load of the 3-phase lines are unbalanced, the respective amounts of these load currents are not necessarily equal to each other. Thus, the voltage potential and the phase angle of each phase of the 3-phase lines may have individual values.

Figure 7A:
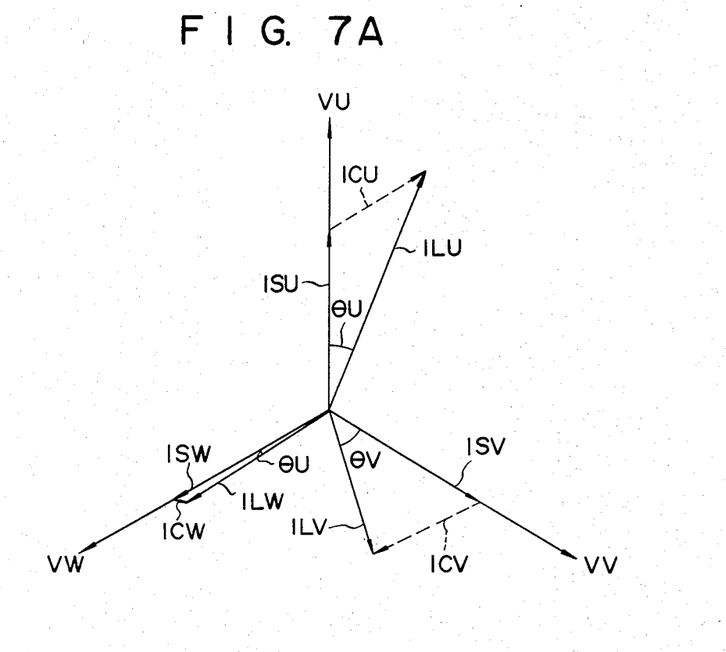
FIGS. 7A and 7B show current/voltage vectors of the embodiment of FIGS. 5 and 6.
Figure 7B:
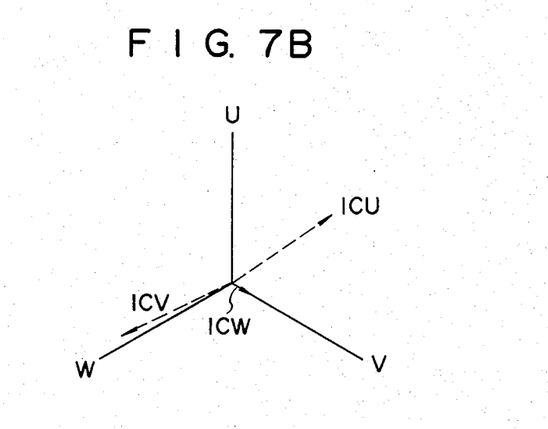

FIG. 7A illustrates voltage/current vectors on the unbalanced 3-phase lines. FIG. 7B illustrates current vectors of 3-phase compensating currents. As seen from FIG. 7A, each of the load currents ILU, ILV and ILW has individual amount and individual phase angles. These load currents ILU, ILV and ILW are compensated by the compensating currents IcU, IcV and IcW as shown in FIG. 7A, such that the AC source currents IsU, IsV and IsW become in-phase to AC source voltages VU, VV and VW, respectively, and that these currents IsU, IsV and IsW have the same amount. Then, even if the load is unbalanced, a balanced 3-phase power supply from the 3-phase AC power source with substantially 100% power factor can be practiced.

The 3-phase power control apparatus of FIGS. 5 and 6 will operate as follows.

First, description will be given to a case where the active component of the 3-phase load is increased from the balanced state. Assume here that the time constant of compensation circuit 20 is large enough. In this case, the peak instruction Im does not respond to the transient change of voltage Vc of phase advance capacitor CAP and, therefore, the active current instructions IsU*, IsV* and IsW* do not vary, while the compensating current instructions IcU*, IcV* and IcW* vary according to the transient change of load currents ILU, ILV and ILW. Then, the compensating currents IcU, IcV and IcW are increased, such that the increment of compensating currents IcU, IcV and IcW cancel the increment of active component of the 3-phase load. The increment of compensating currents IcU, IcV and IcW causes to reduce the voltage Vc of phase advance capacitor CAP, and, the relation "Vc*>Vc" is established. Then, the amount of peak instruction Im becomes gradually large, resulting in increasing of the active current instructions IsU*, IsV* and IsW*. The increase of instructions IsU*, IsV* and IsW* causes to reduce the active component contained in the compensating currents toward the negative side, and renders the potential of voltage Vc of capacitor CAP large. Accordingly, the value of voltage Vc becomes close to the voltage instruction Vc*, and the control operation of the embodiment gets into a stable state in which all active components of power consumed at the load are supplied from the AC power source and such active components are designated by renewed active current instructions IsU*, IsV* and IsW*. During the above control operation, the 3-phase power lines are kept in a balanced state according to the operation of the embodiment.

When the active component of the 3-phase load is decreased from the balanced state, the 3-phase power control apparatus of FIGS. 5 and 6 will operate as follows.

The compensating currents IcU, IcV and IcW are decreased, such that the decrement of compensating currents IcU, IcV and IcW cancel the decrement of active component of the 3-phase load. The decrement of compensating currents IcU, IcV and IcW causes to enhance the voltage Vc of phase advance capacitor CAP, and, the relation "Vc*<Vc" is established. Then, the amount of peak instruction Im becomes gradually small, resulting in decreasing of the active current instructions IsU*, IsV* and IsW*. The decrease of instructions IsU*, IsV* and IsW* causes to enhance the active component contained in the compensating currents toward the positive side, and renders the potential of voltage Vc of capacitor CAP small. Accordingly, the value of voltage Vc becomes close to the voltage instruction Vc*, and the control operation of the embodiment gets into a stable state in which all active components of power consumed at the load are supplied from the AC power source and such active components are designated by renewed active current instructions IsU*, IsV* and IsW*. During the above control operation, the 3-phase power lines are kept in a balanced state according to the operation of the embodiment.

According to the embodiment of the invention, the peak value of the active current is determined from the difference between the voltage instruction Vc* and the voltage Vc of phase advance capacitor CAP serving as a high frequency reactive power source, thereby balancing the 3-phase power lines and compensating the higher harmonic currents and reactive power components thereof.

The present invention will provide the following advantages:

(1) Power loss of the apparatus due to the circulating current Io can be minimized because the amount of circulating current Io of the cycloconverter is independent of the compensating current Ic.

(2) No upper limit is imposed upon the compensating current Ic because the amount of circulating current Io of the cycloconverter is independent of the compensating current Ic.

(3) Simple configuration may be available for balancing the 3-phase power lines, for compensating the reactive power of the power lines and for compensating the higher harmonic currents thereof. This is because the peak value of the active current is determined from the voltage instruction Vc* and the voltage Vc of phase advance capacitor CAP.

Incidentally, the embodiments described in the present specification and illustrated in the appended drawings do not limit the present invention. Any modification may be made within the scope of the claimed invention. For instance, the apparatus of the invention may be modified according to the disclosure of U.S. Pat. No. 4,013,937 issued on Mar. 22, 1977. All disclosures of the above U.S. Pat. are now incorporated herewith.

What is claimed is:

1. A power control apparatus comprising:
cycloconverter means having switching elements in which a circulating current flows, for supplying a compensating current to an AC power line, said compensating current serving to improve the power factor of said AC line;
reactance means for supplying a reactive current component of said compensating current to said cycloconverter means;
trigger control means coupled to said cycloconverter means, for controlling the triggering of said switching elements;
detector means coupled to said cycloconverter means, for detecting a circulating signal corresponding to said circulating current from switching currents flowing through said switching elements, said circulating signal being fed back to said trigger control means so that the amount of said circulating current is kept substantially constant according to a negative feedback operation whose feedback loop includes said cycloconverter means, detector means and trigger control means.

2. An apparatus according to claim 1, further comprising:
phase control means coupled to said cycloconverter means, for generating a phase control signal which corresponds to the difference between a compensating signal being proportional to said compensating current and a compensating current instruction determining the amount of said compensating current, and supplying said phase control signal to said trigger control means, the triggering phase of the switching elements of said cycloconverter means being controlled according to said phase control signal such that the difference between said compensating signal and said compensating current instruction becomes minimum.

3. An apparatus according to claim 2, wherein said trigger control means includes:

frequency control means coupled to said detector means, for generating a frequency control signal which corresponds to the difference between said circulating signal and a circulating current instruction determining the amount of said circulating current; and switching control means coupled to said frequency control means, to said phase control means and to the switching elements of said cycloconverter means, for controlling the triggering of said switching elements in such a way that the triggering frequency of said switching elements is determined by said frequency control signal and the triggering phase of said switching elements is determined by said phase control signal.

4. An apparatus according to claim 3, wherein said frequency control means includes:

means responsive to the difference between said circulating signal and said circulating current instruction, for generating said frequency control signal in such a way that said frequency control signal is substantially free from transient changes of said circulating signal but responsive to stationary changes of said circulating signal.

5. An apparatus according to claim 2, further comprising:

compensating current instruction means coupled to said AC power line, to said reactance means and to said phase control means, for detecting a reactive voltage signal corresponding to said reactive current component, detecting an AC line voltage of said AC line, detecting a load current signal corresponding to a load current flowing from said AC line to a load coupled thereto, and generating said compensating current instruction according to said reactive voltage signal, said AC line voltage and said load current signal.

6. An apparatus according to claim 5, wherein said compensating current instruction means includes:

means for providing said compensating current instruction according to the difference between said load current signal and an active current instruction determining the amount of said load current.

7. An apparatus according to claim 6, wherein said compensating current instruction means further includes:

active current instruction means coupled to said providing means, for generating said active current instruction according to the product of a peak instruction and a unit signal, said peak instruction determining the amplitude of said active current instruction and said unit signal determining the frequency of said active current instruction.

8. An apparatus according to claim 7, wherein said active current instruction means includes:

unit signal means (PTS, Km) coupled to said AC power line, for detecting the frequency component of said AC line voltage and generating said unit signal having a given amplitude and having the frequency of said AC line voltage;

peak instruction means coupled to said reactance means, for generating said peak instruction according to the difference between said reactive voltage signal and a voltage instruction determining the amount of said peak instruction; and multiplier means coupled to said unit signal means and to said peak instruction means, for multiplying said unit signal with said peak instruction to generate said active current instruction.

9. An apparatus according to claim 8, wherein said peak instruction means includes:

means responsive to the difference between said reactive voltage signal and said voltage instruction, for generating said peak instruction in such a way that said peak instruction is substantially free from transient changes of said reactive voltage signal but responsive to stationary changes of said reactive voltage signal.

10. An apparatus according to claim 9, wherein said reactance means includes a capacitor for providing said reactive current component, and said peak instruction means further includes means coupled to said capacitor, for generating said reactive voltage signal corresponding to a reactive voltage appearing across said capacitor.

11. An apparatus according to any one of claims 1 to 10, wherein said cycloconverter means includes a positive converter being formed of a part of said switching elements and a negative converter being formed of another part of said switching elements; said positive converter providing a positive component of said compensating current, said negative converter providing a negative component of said compensating current, a DC component of each of said positive and negative components corresponding to said circulating current, and said positive converter being coupled parallel to said negative converter so that said circulating current circulates between said positive and negative converters.

12. An apparatus according to claim 11, wherein said detector means includes:

positive sensor means coupled to a current output path of said positive converter, for generating a positive current signal corresponding to the positive component of said circulating current;

negative sensor means coupled to a current output path of said negative converter, for generating a negative current signal corresponding to the negative component of said circulating current; and arithmetic means coupled to said positive and negative sensor means and to said trigger control means, for producing said circulating signal from said positive and negative current signals according to the following relation:

$$Io = (IP + IN - |IP - IN|)/2$$

where Io denotes said circulating signal, IP denotes said positive current signal, IN denotes said negative current signal and |IP−IN| denotes the absolute value of the difference between said positive and negative current signals.

* * * * *